United States Patent
Abel et al.

(10) Patent No.: US 10,395,168 B2
(45) Date of Patent: Aug. 27, 2019

(54) TUNABLE OPTICAL NEUROMORPHIC NETWORK

(71) Applicant: International Business Machines Corporation, Armonk, NY (US)

(72) Inventors: Stefan Abel, Zurich (CH); Lukas Czomomaz, Zurich (CH); Veeresh V. Deshpande, Zurich (CH); Jean Fompeyrine, Waedenswil (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 889 days.

(21) Appl. No.: 14/922,300

(22) Filed: Oct. 26, 2015

(65) Prior Publication Data
US 2017/0116515 A1 Apr. 27, 2017

(51) Int. Cl.
*G06N 3/067* (2006.01)
*G06N 3/04* (2006.01)

(52) U.S. Cl.
CPC ......... *G06N 3/0675* (2013.01); *G06N 3/0445* (2013.01); *G06N 3/067* (2013.01)

(58) Field of Classification Search
None
See application file for complete search history.

(56) References Cited

U.S. PATENT DOCUMENTS

| | | |
|---|---|---|
| 9,020,870 B1 | 4/2015 | Daily et al. |
| 2012/0296619 A1 | 11/2012 | Maliassov et al. |
| 2015/0009548 A1 | 1/2015 | Bienstman et al. |

OTHER PUBLICATIONS

Duport, et al., Analog Input Layer for Optical Reservoir Computers, New Journal of Physics, Jun. 12, 2014, pp. 1-17 (Year: 2014).*
F. Duport, et al.,"All-optical reservoir computing," Optics Express, vol. 20, No. 20, Sep. 24, 2012, pp. 1-13.
K. Vandoorne, et al.,"Toward optical signal processing using Photonic Reservoir Computing," Optical Society of America, Optics Epress, vol. 16, No. 15, Jul. 21, 2008, pp. 1-11.
K.Vandoorne, et al., "Experimental demonstration of reservoir computing on a silicon photonics chip," Nature communications, Mar. 24, 2014, pp. 1-6.
L. Appeltant, et al.,"Information processing using a single dynamical node as complex system", Nature Communication, Sep. 13, 2011, pp. 1-6.
List of IBM Patents or Patent Applications Treated as Related; CH920150061US1, Date Filed: Oct. 26, 2015, pp. 1-2.
S. Abel, et al.,"A strong electro-optically active lead-free ferroelectric integrated on silicon", Nature Communications, Apr. 9, 2013, pp. 1-5.
Stefan Abel, et al.,"Optical Synapse for Neuromorphic Networks", U.S. Appl. No. 14/922,292, filed Oct. 26, 2015.

* cited by examiner

*Primary Examiner* — Wilbert L Starks
(74) *Attorney, Agent, or Firm* — Cantor Colburns LLP; Daniel Morris

(57) ABSTRACT

A reservoir computing neuromorphic network includes an input layer comprising one or more input nodes, a reservoir layer comprising a plurality of reservoir nodes, and an output layer comprising one or more output nodes. A portion of at least one of the input layer, the reservoir layer, and the output layer includes an optically tunable material.

19 Claims, 3 Drawing Sheets

TUNABLE OPTICAL NEUROMORPHIC NETWORK

BACKGROUND

This application relates to neuromorphic networks, and in particular, to tunable optical neuromorphic networks.

Neuromorphic networks are widely used in pattern recognition and classification, with many potential applications from fingerprint, iris, and face recognition to target acquisition, etc. The parameters (e.g., 'synaptic weights') of the neuromorphic networks are adaptively trained on a set of patterns during a learning process, following which the neuromorphic network is able to recognize or classify patterns of the same kind.

A key component of a neuromorphic network is the 'synapse,' at which weight information is stored, typically as a continuous-valued variable. For applications that would benefit from compact, high-performance, low-power, portable neuromorphic network computation, it is desirable to be able to construct high-density hardware neuromorphic networks having a large number of synapses ($10^9$-$10^{10}$ or more). Currently a neuromorphic network is typically realized as a software algorithm implemented on a general-purpose computer, although hardware for neuromorphic networks exist.

Neuromorphic networks may be used for three broad types of learning. In "supervised learning" a set of (input, desired output) pairs is provided to the neuromorphic network, one at a time, and a learning algorithm finds values of the "weights" (the adjustable parameters of the neuromorphic network) that minimize a measure of the difference between the actual and the desired outputs over the training set. If the neuromorphic network has been well trained, it will then process a novel (previously unseen) input to yield an output that is similar to the desired output for that novel input. That is, the neuromorphic network will have learned certain patterns that relate input to desired output, and generalized this learning to novel inputs.

In "unsupervised learning," a set of inputs (without "desired outputs") is provided to the neuromorphic network, along with a criterion that the neuromorphic network is to optimize. An example of such a criterion is that the neuromorphic network is able to compress an input into a smaller amount of information (a "code") in such a way that the code can be used to reconstruct the input with minimum average error. The resulting "auto-encoder" network consists of, in sequence, an input layer having a number of neurons or nodes, one or more "hidden" layers, a "code" layer (having relatively few neurons or nodes), one or more hidden layers, and an output layer having the same number of neurons or nodes as the input layer. The entire network is trained as if this were a supervised-learning problem, where the "desired output" is defined to be identical to the input itself.

In a third type of learning, "reinforcement learning," a "reward/penalty" value is provided (by an external "teacher"). The "reward/penalty" value depends upon the input and the network's output. This value is used to adjust the weights (and therefore the network's outputs) so as to increase the average "reward."

For learning, a solution involves using multilevel programming of each synaptic resistance unit, and using the functional capability of the controllers to program the synaptic levels, while maintaining very compact synapse structures (e.g., a PCM element plus one to three transistors, depending upon a desired configuration). For example, using 30 nm technology, a synaptic density of $3.6 \times 10^9$ cm$^{-2}$ may be achieved, with $6 \times 10^4$ controllers attached to each x-line and each y-line. The controllers may consist of $10^4$ or more transistors. The energy required per synapse per step (i.e., per weight change) is several pico-Joules (pJ). For each presentation of an input to the neuromorphic network during learning, the desired weight updates at all the synapses may be performed in a time on the order of 0.02 seconds. During the recognition stage (i.e., following synapse training), the energy consumption and recognition time per image may be reduced.

Neuromorphic network applications may include pattern recognition, classification, and identification of fingerprints, faces, voiceprints, similar portions of text, similar strings of genetic code, etc.; data compression; prediction of the behavior of a systems; feedback control; estimation of missing data; "cleaning" of noisy data; and function approximation or "curve fitting" in high-dimensional spaces.

SUMMARY

A reservoir computing neuromorphic network includes an input layer comprising one or more input nodes, a reservoir layer comprising a plurality of reservoir nodes, and an output layer comprising one or more output nodes. A portion of at least one of the input layer, the reservoir layer, and the output layer includes an optically tunable material.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
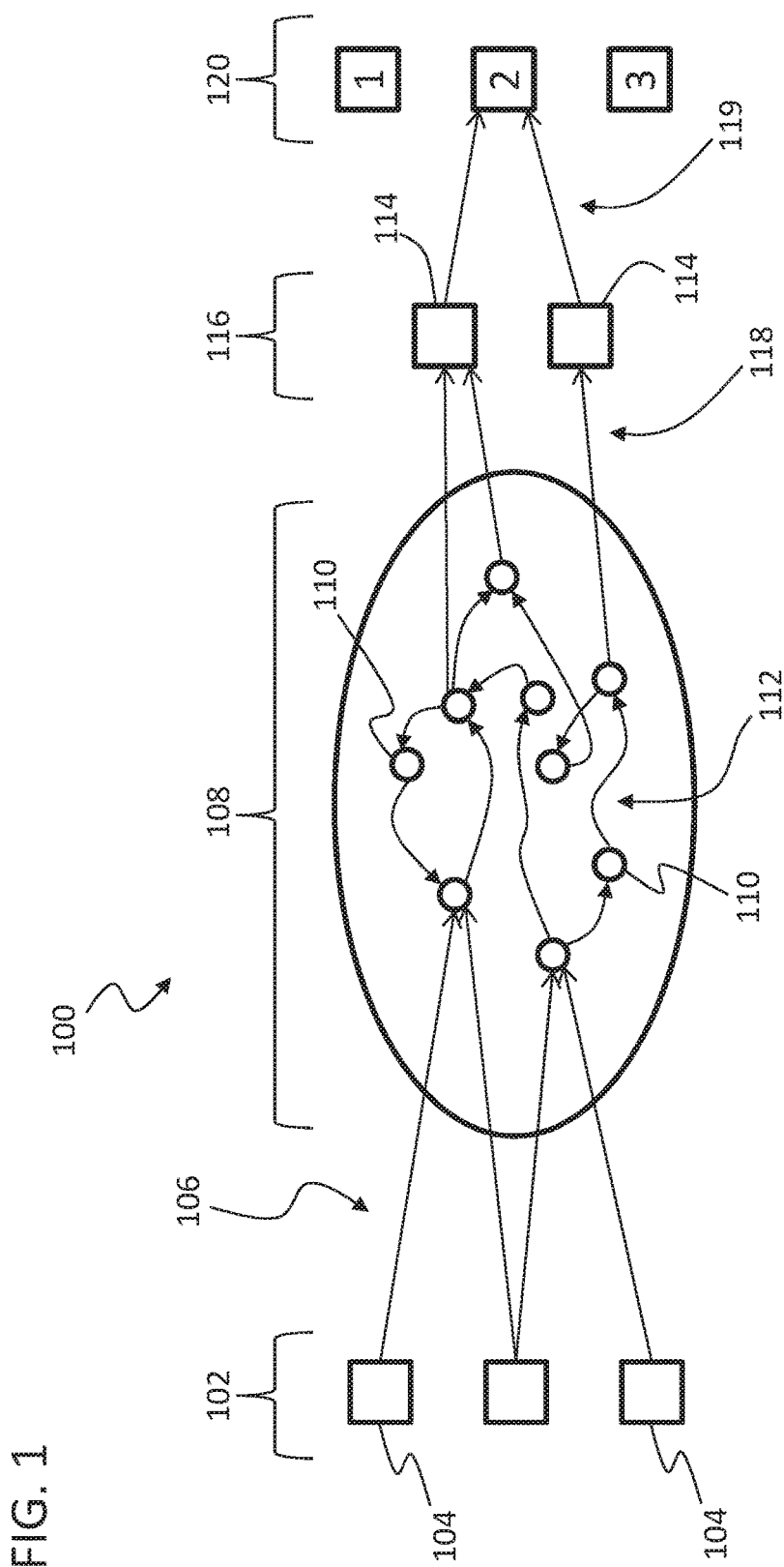
FIG. 1 is a schematic illustration of a neuromorphic network in accordance with an embodiment of the present disclosure.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described with reference to the attached drawings.

According to example embodiments, a basic layout of hardware-implemented neuromorphic networks consist of a set of regularly-spaced "x" and "y" lines intersecting at synaptic nodes. A synaptic node may consist of a programmable analog or multilevel resistor, which may preferably be non-volatile. In at least one example embodiment, this functionality may be realized by a phase change material (PCM) device, which, if necessary, may be programmed with feedback. The read/write functionality may be achieved by the presence of compact controller logic units each having 4-5 or more bits, each attached to an "x" and "y" line running along edges of the array of synaptic nodes. The controllers have functionalities including analog-to-digital (A/D) inputs, digital-to-analog (D/A) outputs, storage for several numbers each having 4-5 or more bits, digital I/O lines, and nonlinear sigmoid-type outputs.

One configuration of a neuromorphic network is an optical reservoir computing system. In such a system, training may be performed externally, although such configuration may be used with embodiments disclosed herein where the training is performed internally to the neuromorphic network. For example, with reference to FIG. 1, a schematic illustration of a neuromorphic network 100 in accordance with an embodiment is shown.

The neuromorphic network 100 is shown as an optical reservoir computing system. The neuromorphic network 100 includes an input layer 102 that includes one or more input nodes or input neurons 104. In one example embodiment, using external training, the input nodes 104 are configured to provide random, fixed input weights over a number of input connections 106. The input connections 106 are configured to optically connect the input layer 102 with a reservoir layer 108.

The reservoir layer 108 includes a number of reservoir nodes or neurons 110. In some embodiments, the reservoir nodes 110 form an optical neuromorphic computing network. Each of the reservoir nodes 110 is connected to one or more other reservoir nodes 110 by connections 112. For example, in some embodiments the connections 112 may be arbitrary connections, random, fixed connections, and/or systematic connections, although other configurations of connections may be employed within the reservoir layer 108 without departing from the scope of the present disclosure. The reservoir layer 108 may receive inputs from the input layer 102 to perform learning, training, and later processing, and may then provide outputs therefrom. In some embodiments, the reservoir layer 108 may be configured with a large number of randomly interconnected nonlinear reservoir nodes 110 with internal connections and feedback loops 112.

One or more of the reservoir nodes 110 of the reservoir layer 108 are connected to one or more output nodes 114 of an output layer 116 through output connections 118. In one example, the output connections 118 may be configured as trained weights, i.e. they will be adjusted such that the output from the reservoir may be controlled by the first output connections 118, and a desired result may be achieved at the output layer 116.

In some embodiments the weighted sum may be a linear weighting and in other embodiments, the weighting may be non-linear. As a result, the output layer is a trained or controlled layer with respect to weighting such that the neuromorphic network 100 can compute desired results, even with unknown inputs. For example, the neuromorphic network 100 may be configured with an output layer that is controlled for weighting that when a known input is supplied at the input layer 102, a known output is generated at the output layer 116. Based on a number of training processes like this, the weighted output connections 118 between the reservoir layer 108 and the output layer 116 may be set, and when an unknown input is supplied to the input layer 102, the output at the output layer 116 may be robust, reliable, and accurate.

As such, in sum, the input layer 102 may receive some information to be identified or classified, the input layer 102 transmits information to the reservoir layer 108, and the reservoir supplies data or information that is identified or classified by the output in the output layer 116.

As described herein, weights or weighting may be an altering or modification of a transmission through a waveguide. That is, the transmission of a pulse through a waveguide may be controlled to provide a greater or lesser weight based on the training of the network, thus having certain connections be stronger while others are weaker. For example, a waveguide can be used where the transmission is tuned during training. In such an example, the output information may be encoded in the amplitude of an optical signal in the waveguide. The optical signal can be superimposed with the signal of other waveguides, and such a system can encode information about a class in different amplitudes.

As another example, weighting may be achieved in a routing change process. For example, one or more Mach-Zehnder interferometers may be used where the phase of the optical mode in one arm of the interferometer is shifted. A signal of a waveguide can be transferred from one waveguide to another waveguide. Such a configuration may enable routing between different or multiple connections. As a result, the training would result in a routing path of input signals to different output waveguides to achieve the desired outcome during the training.

Those of skill in the art will appreciate that other configurations of a neuromorphic network are possible. For example, a reservoir of a neuromorphic network may be configured with virtual reservoir nodes. Time multiplexing may be used in such configurations. However, in these configurations, traditional training is performed at the output layer and performed externally, i.e., trained weights are set and configured at the output layer. In operation, the procedure for learning, training, and weighting, begins with analyzing an output for a given input pattern, such as a known input pattern. Adjustment is made to the output connections/nodes, i.e., the output weights, such that a target (known) output is achieved. The adjustment may be completed using external algorithms that are configured to modify the weighting at the output layer—i.e., weighting of the output connections from specific reservoir nodes to the output nodes such that the correct result is achieved. For example, software base training of software weights, using various fitting algorithms, may be performed. Once training is finished, all output layers may be measured, but the software weights are kept or maintained at the values set during training, thus a consistent result may be achieved. However, while the output layer is adjusted by software, the input layer is kept constant and the connections and weighting within the reservoir are fixed—and the only modifiable layer is the output layer.

As provided herein, an optical neuromorphic network is provided that employs reservoir computing that has reconfigurable reservoir or network, i.e., an internally weighted and trained neuromorphic network. Further, by adjusting the weights of the various connections in the network, the network may be tuned to operate at different stable operation points, and thus may be re-configurable to each of the stable operation points. As described herein, the nodes or neurons of the reservoir layer (or other layers) enable hardware tuning of output, input, and reservoir weights, and do not rely on external software algorithms for providing weighting. That is, in accordance with the present disclosure, weighting and training of an optical neuromorphic network may be performed at the hardware level. The training may require a software algorithm to perform the training, such as providing information about how to adjust the hardware weights. The resulting trained state of the network is encoded non-volatilely in the hardware (i.e., in the nodes and the connections therebetween), rather than being a software weight that is applied during the computing process.

In some embodiments, this is achieved by constructing the reservoir layer (and/or the input/output layers) from materials whose optical properties can be modified permanently, but changeably, such that a change in one of the nodes and/or layers may be long term and achieved through stimuli, resulting in a neuromorphic network that is trained at any level and internally, not relaying on any external software and/or algorithms. The stimuli may be optical, electrical, thermal, mechanical, magnetic, etc., and may depend on the material of the nodes and/or connections that are used to form the network. As such, in some embodiments, the internal connections 112 between the reservoir nodes 110 within the reservoir 108 may be tunable and/or adjusted based on the application of stimuli.

Further, advantageously, embodiments employed herein may enable cascading optical neuromorphic computing. That is, multiple neuromorphic networks may be configured in a tiered or cascaded series such that multiple levels of classifying or computing may be performed within a large neuromorphic network formed of multiple blocks, as described herein.

Embodiments described herein provide a reservoir computing network using optical signals, where the input, interconnections, and/or output nodes are built from devices and materials whose optical transmission can be modified by means of a trigger signal (optical or electrical). Advantageously, such networks can be tailored to have operation points tuned for different wavelengths, operation points optimized for different tasks, and/or, by weighting the input, interconnection, and/or output nodes directly, the output nodes can remain in the optical domain, and hence can be used as an input for consecutive networks (i.e., cascaded networks). Furthermore, energy consumption by the reservoir computing networks using optical signals described herein is minimized as compared to a traditional approach where optical-to-electrical-to-optical conversion is used for the weighting process and for consecutive networks.

In accordance with an embodiment of the present disclosure, a silicon photonics chip is configured as a reservoir computing network. At each or part of the nodes in the reservoir, and at each or part of the nodes at the input and/or output, a structure, e.g. comprising waveguides, resonators, or interferometers having variable transmission, will be used. The transmission function of the resonator will be varied as it is based on materials having a strong electro-optic coefficient or more generally on materials whose optical properties show a dependence on optical or electrical stimuli. Various non-limiting examples are materials where the real part refractive index of the material can be substantially modified upon the application of an electrical field (e.g., materials with a strong Pockels effect) and/or where the imaginary part of the refractive index can be modified by an electric field/current (e.g., materials with a crystalline phase transition: $VO_2$, PCM-materials, etc.). Further, in accordance with some non-limiting embodiments, the change of the optical properties in the material might be caused by optical stimuli (e.g., for phase transitions, photorefractive effect, etc.). Those of skill in the art will appreciate that other materials may be used, other than silicon. For example, III-V semi-conductor materials may be used, without departing from the scope of the present disclosure. As such, any materials that may be used for integrated photonic chips, including silicon, semi-conductor materials, indium phosphide, etc. may be used for forming a reservoir computing network as described herein.

That is, in operation, the neuromorphic network may have nodes and/or layers that are configured to be modified and trained merely based on the application of an optical or electrical signal. The adjustment may be made such that certain connections within the reservoir or between the reservoir and the input or output layers may be weighted.

Figure 2:
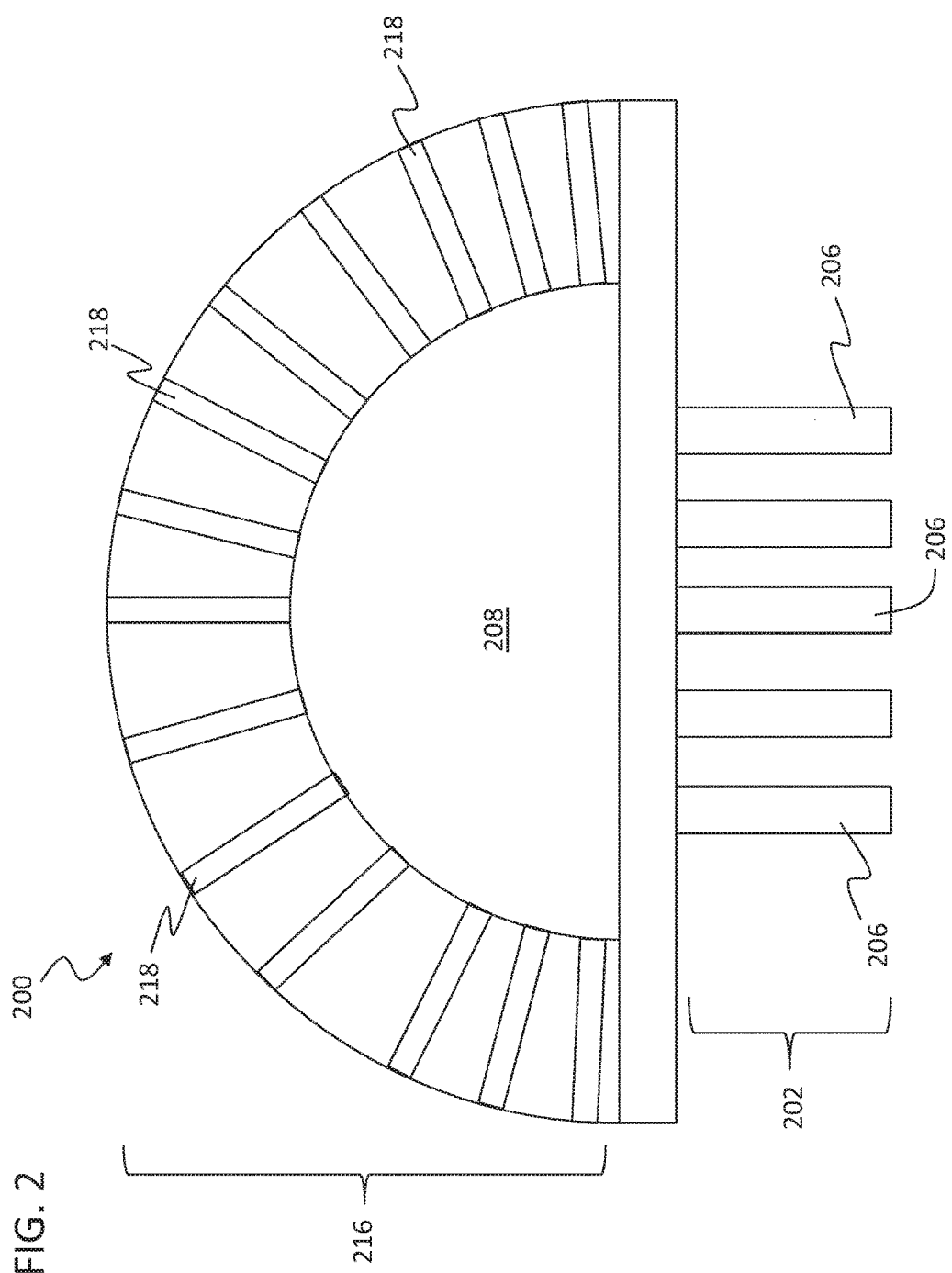
FIG. 2 is a schematic illustration of a hardware configuration of a neuromorphic network in accordance with an embodiment of the present disclosure.

Turning to FIG. 2, a non-limiting schematic configuration of a neuromorphic network 200 hardware configuration is shown. Although shown with a particular geometry, those of skill in the art will appreciate that the configuration shown in FIG. 2 is merely an example and provided for illustrative and explanatory purposes. For example, a reservoir and/or the input/output layers may take any geometry including round, rectangular, or even undefined or amorphous shapes. The neuromorphic network 200 includes an input layer 202 formed of a plurality of input connections 206 which may be configured as input waveguides. In some embodiments the input connections 206 may be formed from photonic crystals. A photonic crystal is a periodic optical nanostructure that affects the motion of photons as the photons pass therethrough, and in some embodiments may be formed in one, two, or three dimensions. An input light signal or pulse may be transmitted along the input connection 206. When the input layer 202 and/or connections are formed as described herein, specific wavelengths, power levels, electrical pulses, etc. may be used to affect the specific input connections 206 that are used as input into a reservoir layer 208.

The input connections 206 are positioned and configured to direct optical pulses toward the reservoir layer 208, which may be formed from a random medium. That is, in some embodiments, the reservoir layer 208 may be formed as a medium that is modifiable or changeable in optical properties based on stimuli. For example, in one non-limiting embodiment the reservoir layer 208 may be formed having a photonic crystal-like structure. Further, in another embodiment, a random arrangement of cells may form or comprise the reservoir layer 208. Such a random arrangement enables a scattering of light to different output connections 218 in an output layer 216, with weighting also possible in the input and output connections 206, 218. As shown, the output layer 216 has an arcuate geometry that surrounds the reservoir layer 208. Those of skill in the art will appreciate that any or all of the various layers may take any geometry or form, and thus FIG. 2 is merely provided as an illustrative example of one configuration and embodiment of the present disclosure.

Because the reservoir layer 208 is formed of a random medium that can have portions thereof change with respect to optical properties based on stimuli, the neuromorphic network 200 may be configured to be trained. As such, the neuromorphic network 200 may be tunable. For example, in accordance with a non-limiting embodiment, tuning of non-linearities may be enabled. In operation, various stimuli, such as feedback stimuli from various nodes within the reservoir layer 208 and/or in the output layer 216, may be used to strengthen or weaken the connections between the various nodes in the reservoir layer 208 and/or between nodes in the reservoir layer 208 and the output layer 216, that is at the output connections 218. This may enable a communication path between the nodes of the reservoir layer to be optimized to be trained to provide a desired output from the neuromorphic network 200.

The output from the reservoir layer 208 may be transmitted along the output connections 218 and may provide an output result through the output layer 216. In an alternative configuration, the output connections 218 may be connected to or configured as an input layer of another neuromorphic network having a similar construction and configuration as the neuromorphic network 200.

In some embodiments, both the input layer 202 and/or the output layer 216 may be formed similar to the reservoir layer 208. That is, the material used to form the input layer 202 and/or the output layer 216 may be changeable with respect to optical properties. Thus, stimuli may be used to provide weighting at the input layer 202 and/or the output layer 216. As will be appreciated by those of skill in the art, any combination of changeable layers may be used, as the weighting disclosed herein may achieved at one or more of the layers of a neuromorphic network.

As will be appreciated by those of skill in the art, and noted above, the specific layout and geometry of a neuromorphic network does not need to be as depicted in FIG. 2. In various configuration, the neuromorphic network could be an (arbitrary) shaped interference zone (e.g. a photonic crystal), with a number of input and output waveguides. As such, there is no need or requirement for the semi-circular or arcuate shape shown in FIG. 2, but rather FIG. 2 provides one example configuration.

As noted, the output layer 216 of the neuromorphic network 200 may be configured to be fed into another neuromorphic network similar to the neuromorphic network 200. As such, cascading may be enabled.

Figure 3:
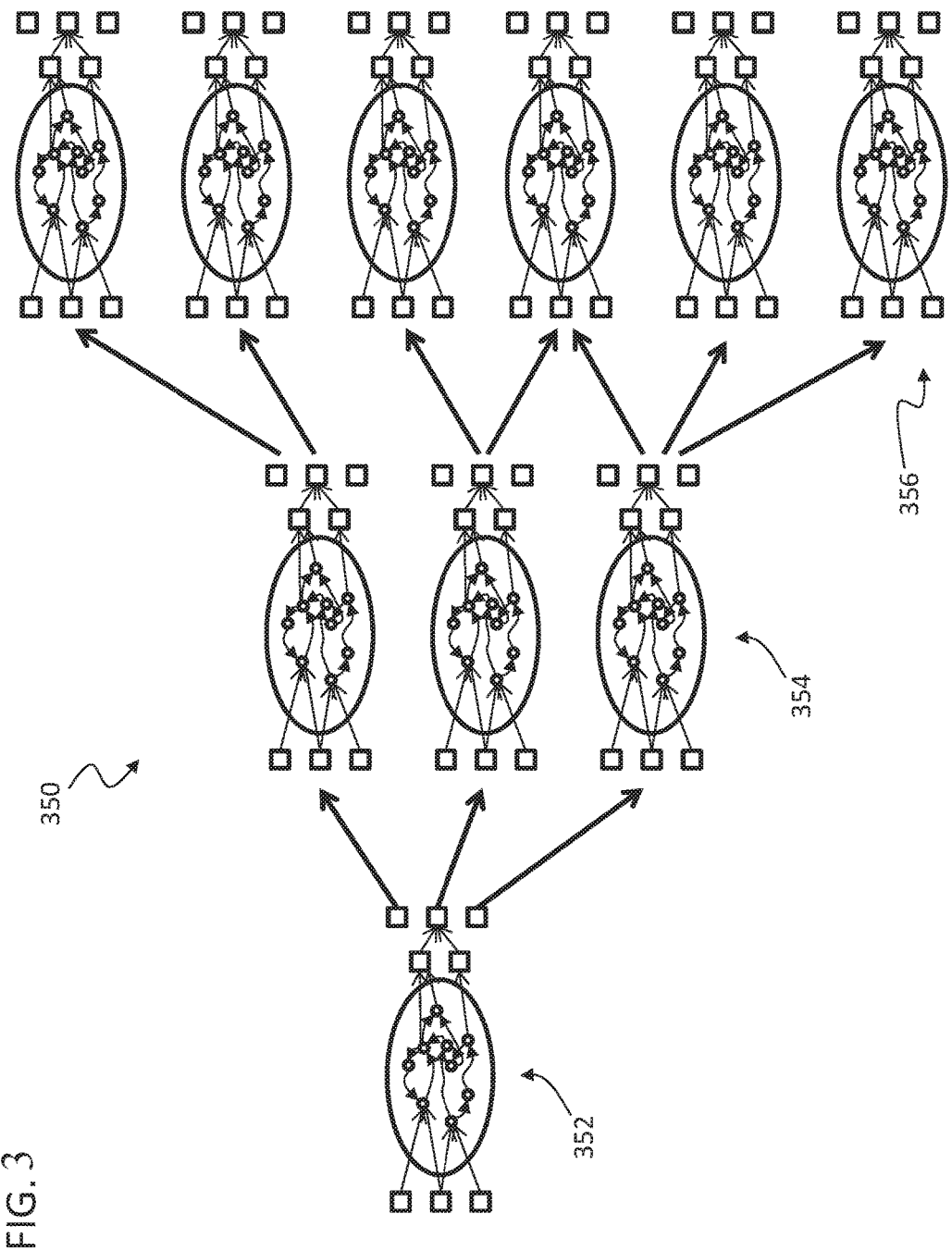
FIG. 3 is a schematic illustration of a cascaded neuromorphic network in accordance with an embodiment of the present disclosure.

For example, with reference to FIG. 3, a cascaded neuromorphic network 350 is shown. The cascaded neuromorphic network 350 includes a first neuromorphic block 352. The first neuromorphic block 352 may be configured similar to the neuromorphic network 100 shown in FIG. 1 or the neuromorphic network 200 of FIG. 2.

The output from the first neuromorphic block 352 may be supplied as input into one or more second neuromorphic blocks 354. Similarly, the output of the second neuromorphic blocks 354 may be supplied as input into one or more third neuromorphic blocks 356. As will be appreciated by those of skill in the art, the cascading may continue for as many blocks as desired.

Further, because each of the neuromorphic blocks is configured as an individual neuromorphic network providing reservoir computing as described herein, complete modifiability and self-teaching/self-weighting may be implemented at each layer within each block and further between each block of the cascaded neuromorphic network 350.

The cascaded neuromorphic network 350 of the present disclosure is enabled because each block of the cascaded neuromorphic network 350 is entirely optical in nature. That is, an optical input is provided and an optical output is generated. Thus, the optical output of one block can become the optical input of a subsequent block in the cascaded neuromorphic network 350. However, the weighting processes may be optical or electrical in nature.

Moreover, because the system, whether configured as a single neuromorphic network or a cascaded neuromorphic network, is entirely optical in terms of inputs and outputs, the systems may be configured to learn and tune based on different wavelengths. As such, not only is cascading enabled, but a multiplexed optical neural network may be formed. That is, multiple inputs each having a different wavelength may pass through the input layer, the reservoir layer, and the output layer, with each wavelength having a different path through the nodes of each layer, based on the weighting that is applied due to the applied stimuli. Further, weighting may be performed that is wavelength sensitive. For example, different wavelengths may experience different transmission through the same physical weighting element, and thus weighting may be performed for different wavelengths within a single physical waveguide or other part of a neuromorphic network.

In the above described embodiments, various materials may be used to form any of the layers of the neuromorphic network, i.e., the input layer, the reservoir layer, and/or the output layer. The material selected to form one or more of the layers may be an optically tunable material. That is, the material may have the optical properties thereof changed based on a stimulus. When a stimuli is applied, the optical characteristics of the material are changed, but after the stimuli is removed, the material persists in the changed state. Thus, although the material is changeable, it is persistent in a state that is achieved. However, further application of stimuli will again change the optical state of the material. This is advantageous so that continuous weighting and/or learning may be performed within the layers of the neuromorphic network.

In some non-limiting embodiments, one or more of the layers or components of a neuromorphic network may be formed from photorefractive materials (e.g., $BaTiO_3$, $LiNbO_3$, $Pb[Zr_xTi_{1-x}]O_3$, etc.), nonlinear materials (e.g., $BaTiO_3$, $KNbO_3$, $LiNbO_3$, $LiIO_3$, AlN, Si, etc.), phase change materials (e.g., TiN, GeSbTe [GST], $VO_2$), magneto-optical materials (e.g., Garnets, (such as $Y_3Fe_5O_{12}$, etc.), or any other materials that may be changeable to optical signals. These materials enable stimuli, such as optical, thermal, magnetic, electrical, mechanical, etc., to be applied to the components of the various layers such that the optical connections between any two specific nodes of any of the layers may be weighted to optimize the neuromorphic network computing.

In some embodiments, the triggering of the optical changes within the neuromorphic network layers may be an all-optical input, such as photorefractive or phase changes based on temperature or high optical power densities. That is, optical triggers may be used to modify and/or change the material of the layers such that optical weighting is performed and achieved. In other embodiments, the triggering of optical properties of the material of the various layers of the neuromorphic network may be made through a trough electrical domain, such as providing electrical feedback at a detector and then applying an electrical pulse (such as a voltage) to alter the optical properties of the material. As will be appreciated by those of skill in the art, any stimuli may be used, including but not limited to optical, thermal, magnetic, electrical, and mechanical stimuli.

A benefit of the present disclosure includes neuromorphic networking having an output layer, an input layer, and/or a reservoir layer that includes programmable weights within the material of the layer (or between the layers). Further, in the reservoir layer, tuning of the dynamics within the reservoir is enabled. For example, embodiments disclosed herein enable adjustable and/or programmable delay line lengths, variable network and/or routing connections, and/or variable splitters.

Further, advantageously, embodiments described herein enable neuromorphic network computing without software weighting, but rather provides hardware weighting within the various layers of the optical neuromorphic network. Further, as described above, cascaded neuromorphic networks are enabled by keeping all processing, inputs, and outputs in the optical domain, such that the output of one block may be supplied directly to the input of another block of a cascaded neuromorphic network. Moreover, by maintaining all aspects in the optical domain, speed advantages arise. For example, no conversion into the electrical domain for weighting has to be carried out. Instead, during the weighting process, the signal is kept in the ultra-fast optical domain. It will be appreciated that the process of training may be performed outside of the optical domain, such as when using electrical stimuli for changing the weights.

Note that variations may be made on the above example embodiments; the example embodiments are intended to cover all such modifications, equivalents, and alternatives falling within the scope of the example embodiments. For example, many nodes may be configured with synapses described herein located on communication lines between each pair or any two nodes in the group of nodes.

While the invention is described with reference to example embodiments, it will be understood by those skilled in the art that various changes may be made and equivalence may be substituted for elements thereof without departing from the scope of the description. In addition, many modifications may be made to the teachings herein to adapt to a particular situation without departing from the scope thereof. Therefore, it is intended that the description and claims not be limited the embodiments disclosed for carrying out the above described features, but that the disclosure and description includes all embodiments falling with the scope of the appended claims. Moreover, the use of the terms first, second, etc. does not denote any order of importance, but rather the terms first, second, etc. are used to distinguish one element from another.

What is claimed is:

1. A reservoir computing neuromorphic network, comprising:
   an input layer comprising one or more input nodes;
   a reservoir layer comprising a plurality of reservoir nodes; and
   an output layer comprising one or more output nodes,
   wherein each of the input layer, the reservoir layer, and the output layer includes an optically tunable material.

2. The reservoir computing neuromorphic network of claim 1, wherein the input layer, the reservoir layer, and the output layer form a first block, the reservoir computing neuromorphic network further comprising:
   a second block having a second input layer comprising one or more second input nodes, a second reservoir layer comprising a plurality of second reservoir nodes, and a second output layer comprising one or more second output nodes, wherein at least one of the second input layer, the second reservoir layer, and the second output layer is formed from an optically tunable material, and
   wherein an input to the second block is an output of the first block.

3. The reservoir computing neuromorphic network of claim 1, wherein the optically tunable material is a III-V semiconductor material, a photorefractive material, an optically nonlinear material, a phase change material, or a magneto-optical material.

4. The reservoir computing neuromorphic network of claim 1, wherein the input layer is formed from photonic crystals.

5. The reservoir computing neuromorphic network of claim 1, wherein the reservoir layer comprises a random medium.

6. The reservoir computing neuromorphic network of claim 1, wherein the reservoir layer comprises photonic crystal-like structure.

7. The reservoir computing neuromorphic network of claim 1, wherein the reservoir is formed from an optically tunable material.

8. The reservoir computing neuromorphic network of claim 1, wherein each reservoir node of the reservoir layer is a tunable node.

9. A reservoir computing neuromorphic network, comprising:
   a first block having a first input layer comprising one or more first input nodes, a first reservoir layer comprising a plurality of first reservoir nodes, and a first output layer comprising one or more first output nodes, wherein a portion of at least one of the first input layer, the first reservoir layer, and the first output layer includes an optically tunable material; and
   a second block having a second input layer comprising one or more second input nodes, a second reservoir layer comprising a plurality of second reservoir nodes, and a second output layer comprising one or more second output nodes, wherein a portion of at least one of the second input layer, the second reservoir layer, and the second output layer includes an optically tunable material,
   wherein an input to the second block is an output of the first block.

10. The reservoir computing neuromorphic network of claim 9, wherein each of the first input layer, the first output layer, and the first reservoir layer is formed from an optically tunable material.

11. The reservoir computing neuromorphic network of claim 9, wherein each of the second input layer, the second output layer, and the second reservoir layer is formed from an optically tunable material.

12. The reservoir computing neuromorphic network of claim 9, wherein the optically tunable material is a III-V semiconductor material, a photorefractive material, a non-linear material, a phase change material, or a magneto-optical material.

13. The reservoir computing neuromorphic network of claim 9, wherein the first input layer and the second input layer are each formed from photonic crystals.

14. The reservoir computing neuromorphic network of claim 9, wherein the first reservoir layer and the second reservoir layer each comprise a random medium.

15. The reservoir computing neuromorphic network of claim 9, wherein the first reservoir layer and the second reservoir layer each comprise photonic crystal-like structure.

16. The reservoir computing neuromorphic network of claim 9, wherein the first reservoir layer and the second reservoir layer each are formed from an optically tunable material.

17. The reservoir computing neuromorphic network of claim 9, wherein each reservoir node of the first reservoir layer and the second reservoir layer is a tunable node.

18. The reservoir computing neuromorphic network of claim 9, wherein the first block and the second block form a part of a cascaded reservoir computing neuromorphic network.

19. The reservoir computing neuromorphic network of claim 9, wherein an output from the first block is an optical signal.

* * * * *

UNITED STATES PATENT AND TRADEMARK OFFICE
CERTIFICATE OF CORRECTION

PATENT NO. : 10,395,168 B2  
APPLICATION NO. : 14/922300  
DATED : August 27, 2019  
INVENTOR(S) : Abel et al.

Page 1 of 1

It is certified that error appears in the above-identified patent and that said Letters Patent is hereby corrected as shown below:

On the Title Page

Column 1, (72) Inventors: should read as follows:  
Stefan Abel, Zurich (CH),  
Lukas Czornomaz, Zurich (CH)  
Veeresh V. Deshpande, Zurich (CH)  
Jean Fompeyrine, Waedenswil (CH)

Signed and Sealed this  
Nineteenth Day of May, 2020

Andrei Iancu  
*Director of the United States Patent and Trademark Office*